United States Patent [19]
Honda et al.

[11] Patent Number: 4,729,833

[45] Date of Patent: Mar. 8, 1988

[54] METHOD OF CONCENTRATING AQUEOUS SOLUTION CONTAINING VOLATILE SUBSTANCE

[75] Inventors: Zenijiro Honda; Hajime Komada, both of Himeji, Japan

[73] Assignee: General Director of the Agency of Industrial Science and Technology, Tokyo, Japan

[21] Appl. No.: 628,190

[22] Filed: Jul. 6, 1984

[30] Foreign Application Priority Data

Jul. 8, 1983 [JP] Japan ................. 58-123474

[51] Int. Cl.⁴ ............................................ B01D 13/00
[52] U.S. Cl. ................................. 210/644; 210/176
[58] Field of Search .................. 210/644, 34.2, 640, 210/176, 180

[56] References Cited

U.S. PATENT DOCUMENTS

| | | | |
|---|---|---|---|
| 2,411,238 | 11/1946 | Zender | 210/644 X |
| 2,712,386 | 7/1955 | Jones et al. | 210/321.2 X |
| 3,035,060 | 5/1962 | Binning et al. | 210/640 X |
| 3,615,024 | 10/1971 | Michaels | 210/490 |
| 4,311,594 | 1/1982 | Perry | 210/640 |

*Primary Examiner*—Frank Spear

*Attorney, Agent, or Firm*—Flynn, Thiel, Boutell & Tanis, P.C.

[57] ABSTRACT

An aqueous solution can be concentrated in respect to a volatile substance contained therein by maintaining the aqueous solution on both sides of a porous membrane which has a pore size of 0.05 to 150 microns and giving a temperature difference between the two respective portions divided by the membrane.

6 Claims, 2 Drawing Figures

METHOD OF CONCENTRATING AQUEOUS SOLUTION CONTAINING VOLATILE SUBSTANCE

This invention concerns a method of separating and concentrating a volatile substance from an aqueous solution containing the volatile substance dissolved therein by the use of a porous membrane and, more specifically, it relates to a method of concentrating a volatile substance dissolved in an aqueous solution by using a porous membrane inert to the aqueous solution to be treated containing the volatile substance dissolved therein, by utilizing a temperature difference as a driving force. Specifically, this invention provides a method of concentrating an aqueous solution containing a volatile substance dissolved therein, wherein an aqueous solution to be treated containing a volatile substance dissolved therein is held on both sides of an inert porous membrane, and maintaining the aqueous solution separated on both sides of the membrane at different temperatures to thereby increase the concentration of the volatile substance in the aqueous solution on the side at a lower temperature.

In this invention, the inert porous membrane involves those membranes which have less chemical affinity with an aqueous solution to be treated upon immersion therein at a treating temperature and, accordingly, are not wetted by the solution, that is, they undergo no solution osmosis. Such membranes can include those made of hydrophobic material with a relatively low surface energy. For instance, porous membranes suitable for use in the method of this invention are those made of fluorine-containing polymers such as polytetrafluoroethylene, poly(trifluorochloroethylene), poly(-hexafluoropropylene) and polyvinylidene fluoride, high molecular polymers consisting of hydrocarbons or halogenated hydrocarbons such as ethylene, propylene, styrene and vinyl chloride, hydrophobic polycondensates such as aromatic polyester, aromatic polyamide and aromatic polysulfone, as well as silicone-containing polymers such as polydimethylsiloxane. Among all, the porous membranes made of polytetrafluoroethylene are particularly preferred membranes for practicing the method of this invention since they are particularly excellent in the chemical stability and the mechanical strength, as well as they are inert to various aqueous solutions at relatively high temperature and high concentration.

It is required that the membrane for use in the concentrating method according to this invention is porous having a pore size, preferably, between $0.05\mu$–$150\mu$ and, more preferably, between $0.1\mu$–$50\mu$. By the use of the porous membrane having such a pore size, concentration can be effected at a high efficiency.

The volatile substance that can be concentrated by the method according to this invention means such a substance in which the content of the volatile substance in the gas phase under the gas-liquid equilibrium of the aqueous solution is greater than the content of the volatile substance in the liquid phase. The volatile substance can include, for example, organic compounds such as methanol, ethanol, n-propanol, iso-propanol, n-butanol, t-butanol, acetone, tetrohydrofuran, 1,4-dioxane, methylamine, ethylamine, dimethylamine, diethylamine, acetonitrile, acetoaldehyde, ethyl methyl ketone or the like, as well as inorganic compounds such as ammonia and hydrogen chloride. The present inventors have found that when an aqueous solution containing such a volatile substance dissolved therein is stored on both sides of the porous membrane, as described above, inert to the aqueous solution and a temperature difference is given to the aqueous solutions on both sides of the membrane, the volatile substance is preferentially transported from the side at a higher temperature to the side at a lower temperature thereby enabling to obtain a concentrated liquid at the lower temperature side.

A suitable temperature difference is between a range of a 3°–70° C., in which the temperature is selected for the aqueous solution at a higher temperature side to between 30°–90° C. and, preferably, between 40°–80° C., while the temperature is selected for the aqueous solution on the lower temperature side to between 40° C. and the melting point and, preferably, between 30° C. and the melting point. The thickness of the porous membrane, while varying depending on the material thereof and the composition of the aqueous solution to be treated, is generally between 20–3000$\mu$ and, preferably, between 50 and 1000 microns. The method according to the invention is effectively conducted for a solution in which the content of a volatile substance is up to 30 percent by weight, preferably up to 20 percent by weight.

In other words, a method according to the invention concentrates an aqueous solution in respect to volatile substance(s) contained therein, by the steps of dividing the aqueous solution on two respective portions and placing them into which a vessel has been partitioned by a porous membrane which is inert to said aqueous solution and has a pore size of from 0.05 to 150 microns so that said respective portions of the aqueous solution may be in contact with said porous membrane; and making the temperatures different between the respective portions of the aqueous solution so that the aqueous solution may be concentrated on the portion having a lower temperature.

The concentrating method according to this invention is applicable to the recovery of valuable volatile substances from factory waste water at high temperature and to a direct concentration of the aqueous solutions of reaction products from the production process in a system reacted at relatively high temperature, and it is also useful for the recovery of volatile substances from aqueous solutions which has required so far a great energy cost. Furthermore, since volume flows are often caused from the higher temperature side to the lower-temperature side, the concentration on the lower temperature side can be attained in a case where no volume flows is resulted or the volume flow is positively interrupted in the concentrating method according to this invention.

This invention will now be explained specifically referring to examples which no way restrict this invention. All references hereinafter to percent are based on weight.

EXAMPLE 1

Figure 1:
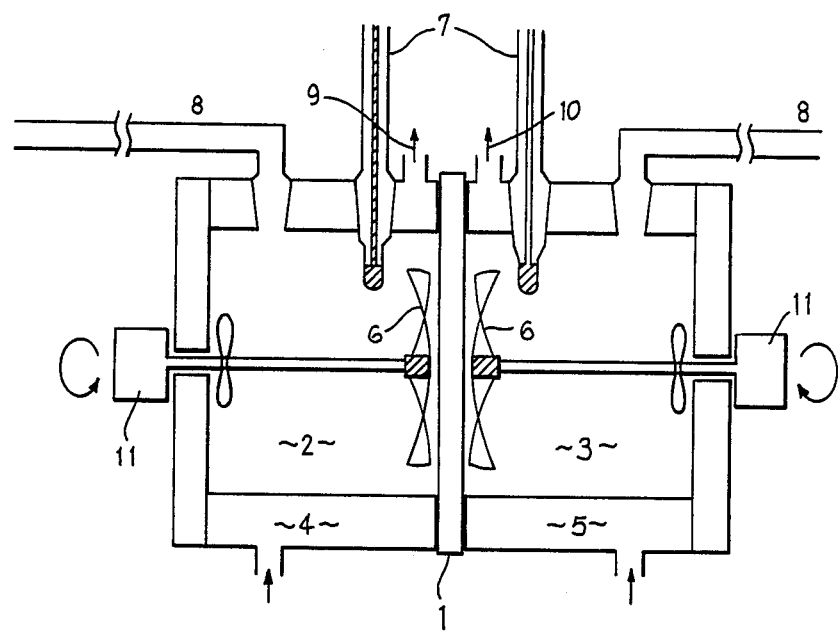
FIG. 1 is a schematic cross sectional view for one embodiment of a separation cell to be used in this invention.

A porous membrane made of polytetrafluoroethylene (POLYFLON PAPER PA-5L, registered trade mark, maximum pore diameter 45μ manufactured by Daikin Co., Ltd.) was mounted to a separation and concentration cell as shown in FIG. 1. In FIG. 1, are shown an inert porous membrane 1, a higher temperature cell 2, a lower temperaure cell 3, a water passing jacket for thermoregulated high temperature water 4, a water passing jacket for thermoregulated low temperature water 5, agitators 6, a thermometers 7, a measuring capillary 8 for measuring the amount of liquid permeated through the membrane, a warm water circulation line 9, a cold water circulation line 10, and motors 11. The effective area of the membrane in the separation cell was 38.5 cm$^2$. When an 1% aqueous ethanol solution was charged each in an amount of 270 ml on both sides of the separation cell and warm water (60° C.) and cold water (0° C.) was passed through the external jackets 4, 5 of the leftward cell (higher temperature cell) 2 and the rightward cell (lower temperature cell) 3 respectively, the temperature was maintained at 51.6° C. for the solution within the higher temperature cell and at 16.5° C. for the solution within the lower temperature cell. The porous membrane 1 described above was not wetted by the solution to be treated in this experiment before and after the experiment.

Figure 2:
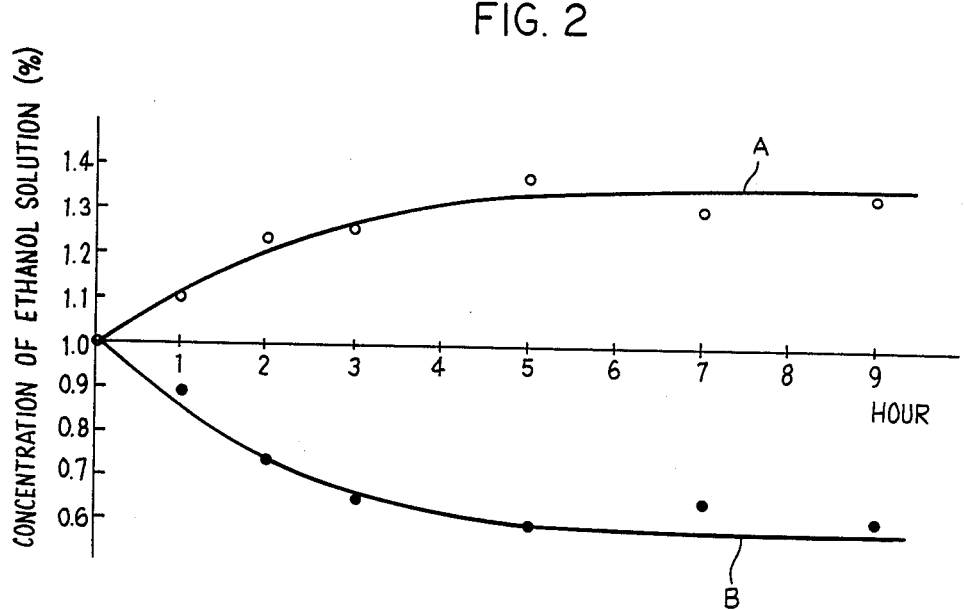
FIG. 2 is a graph showing one example of the change in the concentration with time upon practicing the method of this invention.

After the elapse of a predetermined time, the concentration of the ethanol in the higher temperature and lower temperature cells was measured with time, which showed the change with time as shown in FIG. 2. A represents the concentration curve for the lower temperature cell and B represents the concentration curve for the higher temperature cell. As shown in FIG. 2, the concentration of the ethanol in the lower temperature cell increased with time, while the concentration in the higher temperature cell decreased with time. That is, the ethanol is selectively transported through the membrane from the higher temperature cell to the lower temperature cell and concentrated in the lower temperature cell. The volume flow was directed from the higher temperature cell to the lower temperature cell during a period of 4 hours after the start of the measurement. Accordingly, an aqueous 1% ethanol solution corresponding to the amount of the solution issued from the lower temperature cell was continuously charged to the higher temperature cell. The flow rate at 3 hours after the start was 0.12 g/min. After 4 hours, no volume flow was observed.

EXAMPLES 2-10

Concentration was carried out under the same conditions as in Example 1 excepting that there were used various solutions as shown in Table 1 below instead of the aqueous 1% ethanol solution used in Example 1. The concentrations of the solutions in both of the cells at the initial stage and after 5 hours were as shown in Table 1, in which concentrated solutions could be obtained on the lower temperature cell in each case.

TABLE 1

| | Solute | Initial concentration Higher temperature side | Initial concentration Lower temperature side | Concentration after 5 hours Higher temperature side | Concentration after 5 hours Lower temperature side | Flow rate from observed from higher temp. to the lower temperature side at the elapse of 3 hours |
|---|---|---|---|---|---|---|
| Example 2 | Ethanol | 6% | 6% | 4.9% | 8.2% | $5.2 \times 10^{-3}$ g/min |
| Example 3 | Ethanol | 15.0 | 15.0 | 12.4 | 19.3 | $\approx 0 \times 10^{-3}$ g/min |
| Example 4 | Methanol | 1.0 | 1.0 | 0.6 | 1.4 | $\approx 0 \times 10^{-3}$ g/min |
| Example 5 | 2-propanol | 1.0 | 1.0 | 0.4 | 1.4 | $0.68 \times 10^{-3}$ g/min |
| Example 6 | Butanol | 1.0 | 1.0 | 0.6 | 1.4 | $0.11 \times 10^{-3}$ g/min |
| Example 7 | Acetone | 1.0 | 1.0 | 0.3 | 1.4 | $0.57 \times 10^{-3}$ g/min |
| Example 8 | THF | 1.0 | 1.0 | 0.3 | 1.6 | $\approx 0 \times 10^{-3}$ g/min |
| Example 9 | 1,4-dioxane | 1.0 | 1.0 | 0.6 | 1.9 | $0.65 \times 10^{-3}$ g/min |
| Example 10 | Ammonia | 0.14 | 0.14 | 0.06 | 0.17 | $0.62 \times 10^{-3}$ g/min |

COMPARISON EXAMPLE 1

When The treatment was carried out in the same procedures as in Example 1 excepting the use of a cellulose acetate membrane (MICROFILTER FM45, registered trade mark, average pore size 0.45μ, manufactured by Fuji Film Co., Ltd.) instead of the membrane made of polytetrafluoroethylene in Example 1, no concentration change was observed in the aqueous solutions in both of the cells. The cellulose acetate film as described above was wetted with the aqueous 1% ethanol solution.

The embodiments of the invention in which an exclusive property or privilege is claimed are defined as follows:

1. A liquid permeation method for treating a starting aqueous solution containing a volatile substance dissolved therein to obtain a product aqueous solution containing a higher concentration of said volatile substance, which comprises the steps of: dividing said starting aqueous solution into first and second portions and placing said portions in a vessel on opposite sides of and in contact with an inert, hydrophobic, porous membrane having a pore size of from 0.05 to 150 microns so that said volatile substance can permeate through said membrane, and maintaining the temperature of said first portion lower than the temperature of said second portion so that the temperature difference between said first and second portions is effective as a driving force for selectively transporting said volatile substance present in said second portion through said membrane and thence into said first portion whereby the concentration of said volatile substance in said first portion of said aqueous solution is increased while simultaneously the concentration of said volatile substance in said second portion is decreased.

2. A method as claimed in claim 1 in which the temperature of said second portion is from 30° to 90° C., the temperature of said first portion is from the melting point thereof up to 40° C., the temperature difference between the temperatures of said first and second portions is from 3° to 70° C., and the thickness of the membrane is from 20 to 3000 microns.

3. A method as claimed in claim 2 in which said membrane is made of a material selected from the group consisting of polytetrafluoroethylene, poly(trifluorochloroethylene), poly(hexafluoropropylene), polyvinylidene fluoride, polyethylene, polypropylene, polystyrene, polyvinyl chloride, aromatic polyesters, aromatic polyamides, aromatic polysulfones and polydimethylsiloxane.

4. A method as claimed in claim 2 in which said membrane is made of polytetrafluoroethylene.

5. A method as claimed in claim 1 in which the temperature of said second portion is from 40° to 80° C., the temperature of said first portion is from the melting point thereof up to 30° C., the temperature difference between the temperatures of said first and second portions is from 3° to 70° C., the pore size of said membrane is from 0.1 to 50 microns and the thickness of the membrane is from 50 to 1000 microns.

6. A method as claimed in claim 1 in which said starting aqueous solution contains up to 30 percent by weight of said volatile substance.

* * * * *